US010618706B2

(12) United States Patent
Sterling et al.

(10) Patent No.: US 10,618,706 B2
(45) Date of Patent: Apr. 14, 2020

(54) CHILD-RESISTANT CONTAINERS HAVING SPINNING COLLAR CAP ASSEMBLIES AND METHODS FOR THE MANUFACTURE THEREOF

(71) Applicant: Henkel IP & Holding GmbH, Duesseldorf (DE)

(72) Inventors: Daniel Peter Sterling, Fairfield, CT (US); Keith Jon Colacioppo, Harrison, NY (US); Glenn William Kaye, Stamford, CT (US)

(73) Assignee: Henkel IP & Holding GmbH (DE)

( * ) Notice: Subject to any disclaimer, the term of this patent is extended or adjusted under 35 U.S.C. 154(b) by 84 days.

(21) Appl. No.: 15/727,691

(22) Filed: Oct. 9, 2017

(65) Prior Publication Data

US 2019/0106251 A1  Apr. 11, 2019

(51) Int. Cl.
*B65D 50/06* (2006.01)
*B65D 50/04* (2006.01)
*B65D 41/34* (2006.01)

(52) U.S. Cl.
CPC ....... *B65D 50/061* (2013.01); *B65D 41/3447* (2013.01); *B65D 50/04* (2013.01); *B65D 41/34* (2013.01); *B65D 2215/00* (2013.01); *B65D 2215/02* (2013.01)

(58) Field of Classification Search
CPC .. B65D 50/061; B65D 41/34; B65D 2215/00; B65D 55/02; B65D 41/3447; B65D 41/0471; B65D 41/04; B65D 50/04; B65D 50/041; B65D 50/046; B65D 51/24; B65D 51/18; B65D 51/247; B65D 1/0246; B65D 1/023

USPC ......... 220/254.1, 255, 254.8, 293, 288, 212; 206/528; 215/219, 220, 217, 201, 228, 215/44, 331, 330, 329, 316; 53/490, 485, 53/484

See application file for complete search history.

(56) References Cited

U.S. PATENT DOCUMENTS 3,820,676 A * 6/1974 Mucsi ................. B65D 50/041
                                                   215/220
4,273,248 A * 6/1981 Lehmann ........... B65D 41/0478
                                                   215/331
4,528,933 A * 7/1985 Allen ........................ A61J 7/04
                                                   116/308

(Continued)

*Primary Examiner* — Robert J Hicks
(74) *Attorney, Agent, or Firm* — Bojuan Deng (57) ABSTRACT

Child-resistant containers or packages having spinning collar cap assemblies are provided, as are methods for manufacturing such containers. In various embodiments, the child-resistant container includes a container body having an inner cavity, an opening to the inner cavity, and a container neck circumscribing the opening. A spinning collar is retained around the container neck and is rotatable relative thereto in at least a first rotational direction. The child-resistant container further includes an overcap, which is sized and shaped to enclose the opening when attached to the spinning collar. Through the provision of a suitable threaded interface the overcap can be (i) detached from the spinning collar by rotation of the overcap relative to the spinning collar in the first rotational direction and (ii) removably attached to the spinning collar by rotation of the overcap relative to the spinning collar in a second rotational direction opposite the first rotational direction.

14 Claims, 3 Drawing Sheets

(56) References Cited

U.S. PATENT DOCUMENTS

| | | | | |
|---|---|---|---|---|
| 5,027,954 A * | 7/1991 | Hickerson | ............... | B65D 50/04 |
| | | | | 215/201 |
| 5,213,225 A * | 5/1993 | King | ................. | B65D 41/0471 |
| | | | | 215/214 |
| 5,579,934 A * | 12/1996 | Buono | ................. | B65D 50/041 |
| | | | | 215/219 |
| 5,588,545 A * | 12/1996 | King | ......................... | B65D 1/02 |
| | | | | 215/216 |
| 5,735,417 A * | 4/1998 | Darr | ..................... | B65D 50/046 |
| | | | | 215/216 |
| 5,743,419 A * | 4/1998 | King | ................. | B65D 41/0471 |
| | | | | 215/217 |
| 9,422,091 B2 * | 8/2016 | Martin | ................. | B65D 50/043 |
| 2017/0137189 A1 * | 5/2017 | McPherson | .......... | B65D 55/024 |

\* cited by examiner

CHILD-RESISTANT CONTAINERS HAVING SPINNING COLLAR CAP ASSEMBLIES AND METHODS FOR THE MANUFACTURE THEREOF

TECHNICAL FIELD

Embodiments of the present invention relate generally to child-resistant packaging and, more particularly, to child-resistant containers having spinning collar cap assemblies, as well as to associated manufacturing methods.

BACKGROUND

A child-resistant package is designed to reduce the ease with which children are able to access the contents stored within the package. A pill bottle or similar molded plastic container having a neck, for example, may be rendered child resistant through the usage of a specialized cap, which is attachable to the container neck. Jointly, the container neck and the cap form a child-resistant cap assembly, which requires the performance of certain actions to detach the cap from the container neck. The cap and container neck may engage along a threaded interface, in which case cap removal may be prevented by obstructing rotation of the cap relative to the container neck in some manner. For example, in one common design, the cap is molded to include flexible tabs located about the periphery of the cap. Cap rotation relative to the container neck is obstructed unless the tabs are depressed inwardly by an adult user, while the user simultaneously turns the cap in the appropriate direction. In another common design, removal of a threaded cap is prevented unless the cap is turned in the correct direction, while pressed downwardly toward the container body. In other instances, a child-resistant cap assembly may lack a threaded interface between the cap and container neck, in which case cap removal may be restricted utilizing a different approach. For example, in this latter case, the cap assembly may be designed such that cap removal is possible only after rotation of the non-threaded cap to a particular angular position or clocking relative to the container body.

While often relatively non-complex in a structural sense, child-resistant cap assemblies can be deceptively difficult to design. An inexorable tradeoff is encountered in designing a child-resistant cap assembly that the vast majority of adults (including the elderly and those with disabilities) find intuitive and relatively non-cumbersome to use, while most children find prohibitively difficult to open. Relatively few, if any conventional child-resistant cap assemblies strike an ideal balance between these competing factors. There thus exists an ongoing demand for child-resistant cap assemblies providing enhanced child deterrence characteristics, while further maintaining or improving adult ease-of-use. Concurrently, it would be desirable for such child-resistant cap assemblies to be amenable to cost effective manufacture and, perhaps, capable of relatively seamless incorporation into legacy product lines and manufacturing practices.

BRIEF SUMMARY

Embodiments of a child-resistant container or package having a spinning collar cap assembly are provided. In various embodiments, the child-resistant container includes a container body having an inner cavity, an opening to the inner cavity, and a container neck circumscribing the opening. A spinning collar is retained around the container neck and rotatable relative thereto in at least a first rotational direction. An overcap is sized and shaped to enclose the opening and thereby block access to the inner cavity when the overcap is attached to the spinning collar. The child-resistant container further includes a threaded interface, which is provided between the spinning collar and the overcap. The threaded interface enables the overcap to be (i) detached from the spinning collar by rotation of the overcap relative to the spinning collar in the first rotational direction and (ii) removably attached to the spinning collar by rotation of the overcap relative to the spinning collar in a second rotational direction opposite the first rotational direction. In implementations in which the spinning collar is rotatable with respect to the container neck in the first rotational direction through a 360 degree range of motion, the spinning collar may co-rotate with the overcap when turned in the first rotational direction and rotation of the spinning collar is manually undeterred; that is, the spinning collar is not grasped or otherwise physically contacted by a user in a manner preventing rotation of the collar in conjunction with rotation of the overcap.

Embodiments of a child-resistant cap assembly are further provided. In one embodiment, the child-resistant cap assembly includes a spinning collar and an overcap, which has threaded inner surface. The spinning collar includes, in turn, an annular collar body, which is sized and shaped for installation around a container neck, such as the neck of a molded bottle, which has an outer circumferential channel. A threaded outer surface is provided around an outer periphery of the annular collar body. The threaded outer surface of the spinning collar cooperates or combines with the threaded inner surface of the overcap to enable the overcap to be removably attached to the spinning collar by rotation of the overcap relative to the spinning collar in a first rotational direction (e.g., the below-described twist-on direction). A retention feature, such as a snap lug, projects from the annular collar body in a radially inward direction; that is, in a direction substantially perpendicular to a centerline of the annular collar body. The retention feature is configured (sized and shaped) to engage into the outer circumferential channel to retain the spinning collar around the container neck, while permitting rotation of the spinning collar relative to the container neck in a second rotational direction (e.g., the below-described twist-off direction) opposite the first rotational direction.

Methods for manufacturing a child-resistant package are still further provided. In one embodiment, the method includes the step or process of installing a spinning collar around the container neck of a package or container, such as a molded plastic bottle. Installation is performed such that the spinning collar is retained around the container neck, while relative rotation of the collar and container neck is permitted in at least in a first rotational direction. An overcap is removably attached to the spinning collar by placing a threaded inner surface of the overcap in contact with a threaded outer surface of the spinning collar and rotating the overcap relative to the spinning collar in a second rotational direction opposite the first rotational direction. In certain implementations, the spinning collar may be installed around the container neck by press-fitting. During press-fitting, a snap lug or other projection provided on the spinning collar may contact and slide over a neck bead, which extends at least partially around an outer periphery of the container neck, such that the projection engages into an outer circumferential channel further provided around the container neck.

The foregoing statements are provided by way of non-limiting example only. Various additional examples, aspects, and other features of embodiments of the present disclosure are encompassed by the present disclosure and described in more detail below.

BRIEF DESCRIPTION OF THE DRAWINGS

At least one example of the present invention will hereinafter be described in conjunction with the following figures, wherein like numerals denote like elements, and.

For simplicity and clarity of illustration, descriptions and details of well-known features and techniques may be omitted to avoid unnecessarily obscuring the exemplary and non-limiting embodiments of the invention described in the subsequent Detailed Description. It should further be understood that features or elements appearing in the accompanying figures are not necessarily drawn to scale unless otherwise stated.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

Overview

Child-resistant containers including spinning collar cap assemblies are provided, as are methods for manufacturing such cap assemblies. Generally, the child-resistant containers described herein and, particularly, the spinning collar cap assemblies restrict access to the package contents in a manner providing effective child deterrence, while further ensuring adult ease-of-use. This is principally accomplished through the provision of a spinning collar, which is secured around a neck portion of the container in a manner allowing relative rotation between the collar and the container neck in at least a first rotational direction and through a 360 degree (°) angular range of motion (ROM). An overcap or lid can be attached to the spinning collar in a manner physically covering an opening circumscribed by the container neck, thereby enclosing container's interior and preventing access to the contents stored therein. In various embodiments, the overcap and spinning collar engage along a threaded interface, which allows removal of the overcap by rotation of the overcap relative to the spinning collar in the first rotational direction. For ease of reference, this rotational direction is referred to herein as the "twist-off" direction, while the opposing rotational direction is referred to herein as the "twist-on" direction. By widespread design practices, the twist-off and twist-on directions will typically correspond to counter-clockwise and clockwise directions, respectively, although this relationship can be reversed if so desired; that is, the twist-on and twist-off directions may respectively correspond to clockwise and counter-clockwise directions in alternative embodiments.

As the spinning collar is able to freely rotate relative to the container neck in the twist-off direction through a 360° ROM, rotation of the spinning collar in this direction remains undeterred when simply grasping the body of the child-deterrent container, as may be intuitively done by child. Consequently, a child attempting to open the child-deterrent container by grasping the container body and attempting to rotate the overcap in the twist-off direction will be unable to remove the overcap and gain access to the container's contents. In this instance, the overcap and the spinning collar will co-rotate relative to the container body, while the overcap remains securely attached to the container neck. The co-rotation of the overcap and spinning collar may, in effect, create a diversion or decoy at least temporarily delaying further efforts by the child to gain access to the container. Additionally, the spinning collar cap assembly can be designed such that the spinning collar is visually deemphasized to many children and, therefore, less likely to be firmly grasped by a child when attempting to remove the overcap.

To detach the overcap from the spinning collar and gain access to the container interior, an adult user is required to both rotate the overcap in the twist-off direction, while manually preventing rotation of the spinning collar relative to the overcap. To enable a user to manually prevent rotation of the collar, the spinning collar is imparted with a manual grip portion that can be grasped or otherwise manually contacted by an adult user from the exterior of the child-resistant container when the cap assembly is closed. Various design aspects of the manual grip portion can be tailored to render the cap assembly relatively challenging for the vast majority of children to defeat or bypass, while maintaining a desired level of ease-of-use for adults. Additionally, other features may be included in the child-deterrent cap assembly for improving child deterrence or enhancing adult ease-of-use. For example, in certain implementations, the child-deterrent cap assembly may further include a unidirectional rotational interface between the spinning collar and the container neck. When provided, the unidirectional rotational interface prevents rotation of the spinning collar relative to the container neck (and, more generally, the container body) through a ROM less than 360° in the twist-on direction. This, in turn, may allow an adult user to reattach the overcap by rotating the overcap in the twist-on direction, while holding the container body. Adult ease-of-use is enhanced as a result, while consistent reattachment of the overcap is encouraged to help ensure that the child deterrent mechanism of the cap assembly is reset after container access.

Embodiments of the spinning collar cap assembly are amenable to cost-effective manufacture and, in certain cases, may be incorporated into existing product lines in a relatively seamless manner. For example, in implementations, the spinning collar can be structurally configured (sized and shaped) for compatibility with so-called "snap lid" neck finishes, which have gained widespread market adoption. Generally snap lid neck finishes feature a raised lip or "snap bead," which extends partially around an outer circumference of the container neck for usage in conjunction with a corresponding snap lid. The spinning collar may be structurally configured to adapt to such a snap lid neck finish, in embodiments, and may further include various unique features cooperating with the neck finish to provide the unique functionalities. Additionally, in certain instances, a given snap lid neck finish may be modified to include other non-conventional features, such as snap lug features of the type described below. Advantageously, such features can be often incorporated into existing tooling or molds through relatively minor (e.g., metal safe) modifications. This notwithstanding, the spinning collar cap assembly may cooperate with or include a container neck having a different type of neck finish in other embodiments. An exemplary embodiment of a child-resistant container including spinning collar cap assembly will now be described in conjunction with FIGS. 1-3.

Example of a Child-Resistant Container Including a Spinning Collar Cap Assembly

Figure 1:
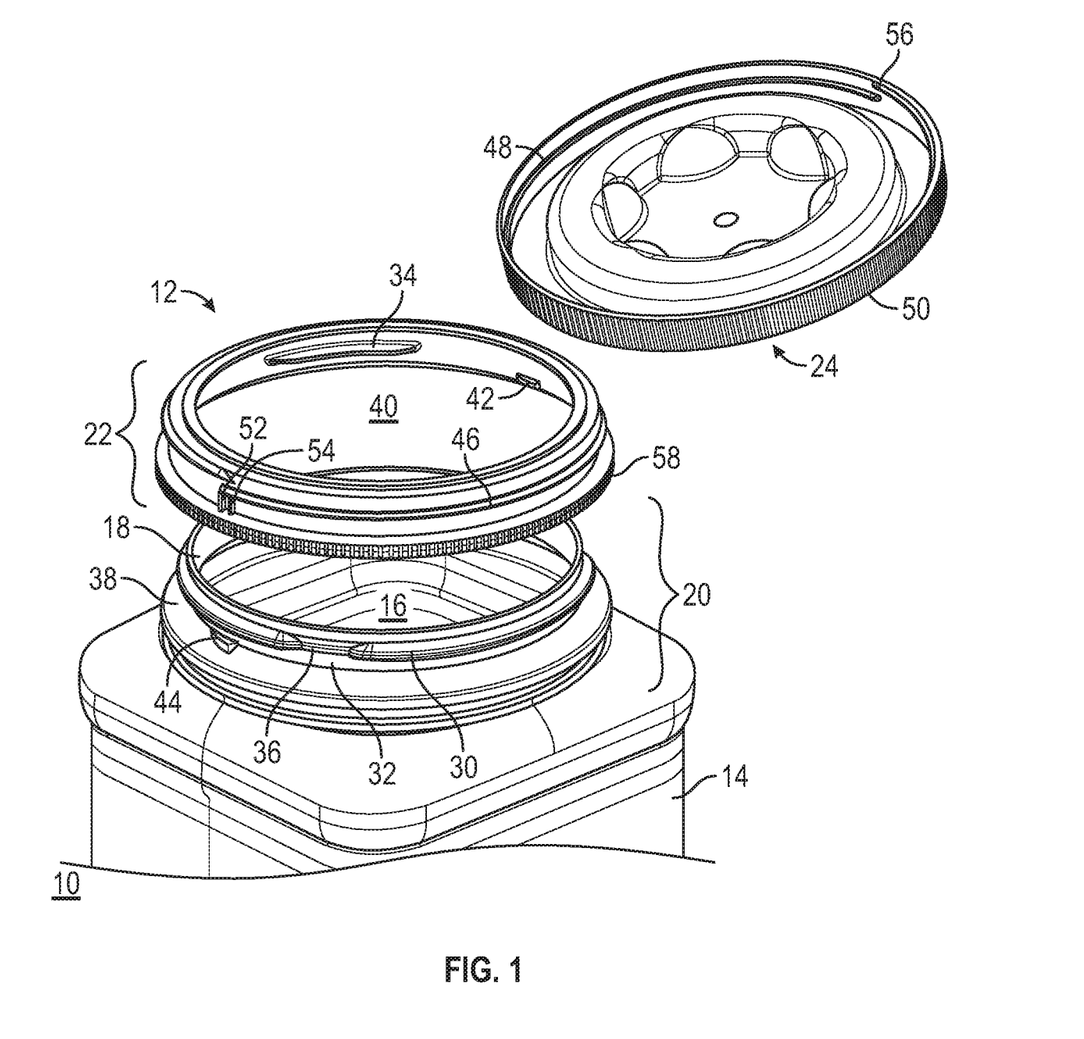
FIG. 1 is a disassembled or exploded isometric view of a child-resistant container including a spinning collar cap assembly, as illustrated in accordance with an exemplary embodiment of the present disclosure.

FIG. 1 is a disassembled or exploded isometric view of a child-resistant container 10 including a spinning collar cap assembly 12, as illustrated in accordance with an exemplary and non-limiting embodiment of the present disclosure. Child-resistant container 10 includes a vessel or container body 14, only the upper portion of which is shown. In this particular example, container body 14 assumes the form of a molded plastic bottle, which is well-suited for holding single use detergent capsules. It is emphasized, however, that the particular form factor of container body 14 and the contents of container 10 will vary among embodiments. Spinning collar cap assembly 12 can be utilized in conjunction with or incorporated into various different types of child-resistant containers, without limitation, and with the bottle container shown in FIG. 1 being but one suitable example. Moreover, the particular contents or materials held within container 10 are generally inconsequential to the present disclosure and can include pill-form medication, as well as various other items, depending upon the particular size, shape, and composition of container body 14.

An inner cavity 16 is located within the interior of container body 14. A throat or opening 18 is provided in the upper end portion of body 14 to allow physical access to cavity 16 when cap assembly 12 is opened. A container neck 20 extends from container body 14 to circumscribe or peripherally bound opening 18. In the illustrated example, container body 14 and container neck 20 are integrally formed as a single (e.g., blow molded) piece. In further embodiments, container body 14 and container neck 20 can be separately fabricated from the same, similar, or dissimilar materials, and subsequently joined in some manner. For example, in one implementation, container neck 20 can be fabricated as a blow molded, injection molded, or additively-manufactured piece, while container body 14 is separately produced as a non-rigid structure (e.g., a flexible bag or collapsible vessel) to which container neck 20 is subsequently attached. Various other constructions are also possible. While such a structural design will generally be less common than that shown in FIG. 1, this is nonetheless noted to further emphasize that spinning collar cap assembly 12 is highly adaptable and can be incorporated into an essentially limitless range of packaging types. Container neck 20 may be considered part of spinning collar cap assembly 12 in at least some embodiments of child-resistant container 10.

Figure 2:
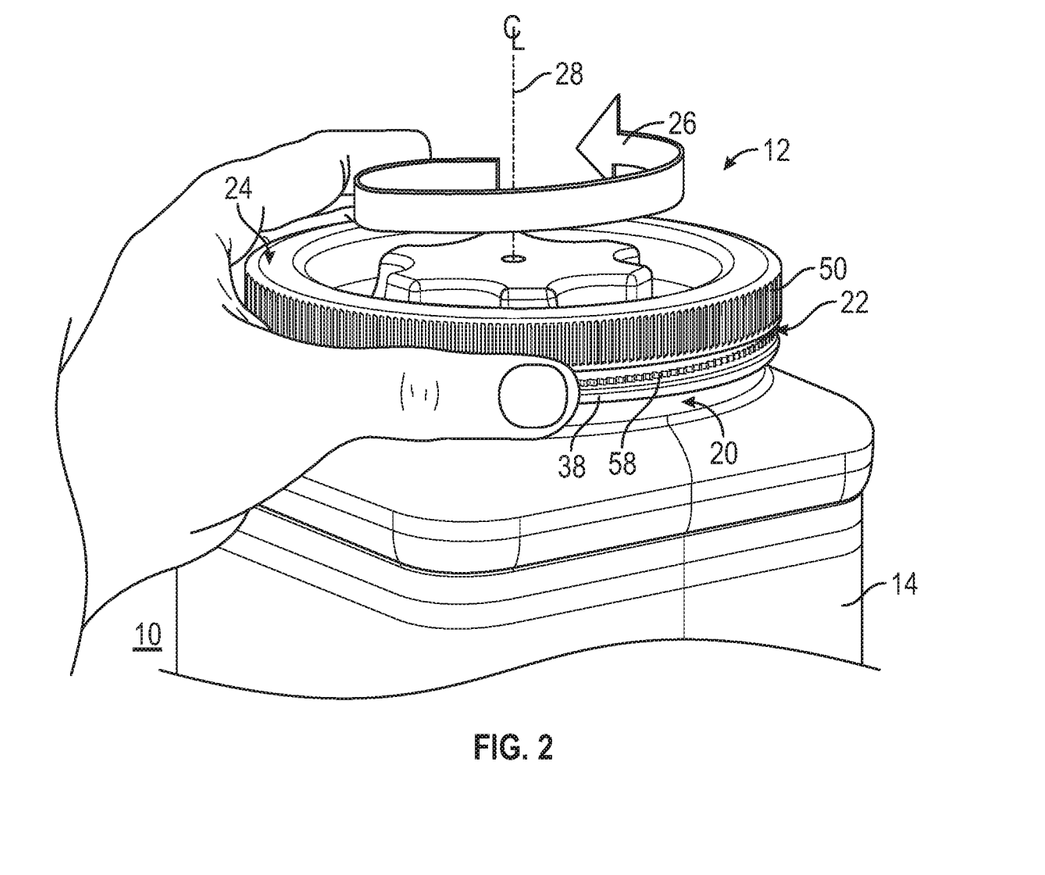
FIG. 2 is an assembled isometric view of the exemplary child-resistant container shown in FIG. 1 illustrating one manner in which the overcap of the cap assembly can be manually detached from the spinning collar to provide adult access to the interior of the container and any contents stored therein.

In addition to container neck 20, spinning collar cap assembly 12 includes a spinning collar 22 and a lid piece or overcap 24. Spinning collar 22 is retained around container neck 20 when spinning collar cap assembly 12 is assembled, as shown in FIG. 2. Comparatively, overcap 24 can be removably attached to spinning collar 22, when desired, to enclose opening 18 and prevent physical access to inner cavity 16. Overcap 24 can be removed or detached from spinning collar 22 to expose opening 18 and provide access to inner cavity 16 when certain steps or physical actions are performed by an adult user. As indicated by the descriptor "spinning," collar 22 is capable of 360° rotation (that is, rotation over and through a 360° ROM) relative to container neck 20 in at least one rotational direction, as taken about a rotational axis represented in FIG. 2 by dashed line 28. Stated differently, spinning collar 22 is rotatable relative to container neck 20 about axis 28 through any number of complete, 360° revolutions in at least one rotational direction; again, referred to herein as the "twist-off" direction. As noted above, and as indicated in FIG. 2 by arrow 26, the twist-off direction will typically (but does not necessarily) correspond to a counter-clockwise direction. In certain implementations, spinning collar 22 may likewise be capable of 360° rotation relative to container neck 20 in the opposing rotational direction (the "twist-on" direction). It is generally desirable, however, to prevent rotation of spinning collar 22 through a 360° ROM relative to container neck 20 in the twist-on direction to facilitate overcap reattachment. Accordingly, in embodiments, spinning collar 22 may be rotatable relative to neck 20 in the twist-on direction, but through an angular ROM less than 360°.

As shown most clearly in FIG. 2, spinning collar cap assembly 12 may be designed such that rotational axis 28 is substantially coaxial with the respective centerlines of container neck 20 and spinning collar 22, as considered when spinning collar cap assembly 12 is fully assembled and closed. The respective centerlines of container neck 20 and spinning collar 22 may also be aligned or positioned in a substantially co-axial relationship when spinning collar cap assembly 12 is assembled and closed. Accordingly, dashed line 28, as shown in FIG. 2, may be considered to further represent the respective centerlines of container neck 20 and spinning collar 22. Spinning collar 22 may also be described as freely rotatable through a 360° ROM with respect to container neck 20 in the twist-off direction, as taken about the centerline of collar 22 or about the centerline of neck 20.

A collar retention interface 30, 32, 34 is formed between container neck 20 and spinning collar 22. Collar retention interface 30, 32, 34 can assume any structural form and include any number and type of structural features serving to physically retain or capture spinning collar 22 about container neck 20, while permitting collar 22 to rotate relative to neck 20 in at least the twist-off direction. In the illustrated example, collar retention interface 30, 32, 34 includes an annular rib or snap bead 30, which extends around a majority of an outer periphery of container neck 20. Specifically, snap bead 30 extends around the periphery of container neck 20 in its substantial entirety, with the exception of angular gap 36. Angular gap 36 may span, for example, a 5° to 20° angular range, as taken about rotational axis 28. Angular gap 36 is generally unneeded in the illustrated example from a functional standpoint, but is shown to emphasize the relative ease with which cap assembly 12 can be utilized in conjunction with existing snap lid neck finishes, which may or may not be modified to varying extents.

As stated above, container neck 20 is imparted with a snap lid neck finish in the illustrated embodiment. Setting aside certain modifications, the snap lid neck finish shown in FIGS. 1-2 is generally similar to an existing design, which has gained widespread market adoption. The general design of container neck 20 may thus have been intended, originally, for usage in conjunction with a corresponding snap-fit lid or, more simply, a "snap lid." Snap lids of this type are commercially available and typically include an inner projection or key, which extends radially inwardly from an inner periphery or inner diameter (ID) of the cap sidewall. To remove the snap lid from container neck 20, an adult user rotates the lid to align the projection or key with angular gap 36, which serves as a keyway or passageway. The user then exerts an upwardly lifting force, typically with his or her thumb, to remove the snap lid from neck 20 in a prying motion. In the present example, spinning collar cap assembly 12 has supplanted or replaced such a snap lid, in part by leveraging pre-existing snap bead 30 to retain spinning collar 22 around container neck 20.

Snap bead 30 cooperates with a lower annular shelf or ridge 38, which further extends around an outer periphery or outer diameter (OD) of container neck 20, to define an annular groove or outer circumferential channel 32 around neck 20. Spinning collar 22 further includes at least one inner protrusion, projection, or snap lug 34, which is received within outer circumferential channel 32 when collar 22 is installed around container neck 20. As shown most clearly in FIG. 1, snap lug 34 extends from an inner peripheral surface of spinning collar 22 in a radially inward direction. The term "radial," as appearing herein, is defined as a direction perpendicular to centerline 28 of spinning collar 22 (or to the centerline of container neck 20, as will be clear from context). In the illustrated example in which snap bead 30 is interrupted by annular gap 36, snap lug 34 is usefully imparted with a length or span, as measured about the centerline of collar 22, exceeding the length or span of gap 36, as measured about the centerline of neck 20.

By virtue of the above described structural arrangement, undesired removal of spinning collar 22 is prevented (or at least rendered unreasonable for the user, in a practical sense) following assembly of spinning collar cap assembly 12. Further, spinning collar 22 is sufficiently flexible and dimensioned to enable collar 22 to be press-fit onto container neck 20 during original manufacture and assembly. When spinning collar 22 is press-fit onto container neck 20 during assembly, snap lug 34 contacts and slides over snap bead 30 before engaging into outer circumferential channel 32. Following engagement of snap lug 34 into circumferential channel 32, removal of spinning collar 22 from container neck 20 is obstructed by abutment of snap lug 34 against snap bead 30. The respective materials, dimensions, and sloped contours of snap lug 34 and snap bead 30 can be tailored to readily allow such a snap fit action, while securely retaining collar 22 around container neck 20 following assembly.

Spinning collar 22 has a substantially annular, tubular, or ring-shaped body through which a central opening 40 is provided. The body of spinning collar 22 is dimensioned such that an upper portion of container neck 20 can be received through central opening 40 in a relatively close-fitting relationship. Additionally, as noted above, spinning collar 22 and container neck 20 are usefully imparted with certain unidirectional rotation features preventing or at least hindering rotation of collar 22 relative to neck 20 (and, more broadly, container body 14) through a ROM less than 360° in the twist-on direction. For example, as best shown in FIG. 1, spinning collar 22 may be further imparted with at least one ratchet lug 42, which extends radially inward from an inner periphery of collar 22. Similarly, container neck 20 may additionally feature a corresponding ratchet lug 44, which extends radially outward from an outer periphery of container neck 20. In the depicted embodiment, ratchet lug 44 is located within outer circumferential channel 32 and may be positioned closer to annular ridge 38 than to snap bead 30, as taken along the centerline of neck 20 (again, corresponding to dashed line 28 in FIG. 2). Comparatively, ratchet lug 42 may be located proximate or adjacent a lower peripheral edge of spinning collar 22 and, perhaps, located closer to the lower peripheral edge of collar 22 than is snap lug 34.

Ratchet lugs 42, 44 are contoured (e.g., imparted with ramp-like geometries) such that, when ratchet lugs 42, 44 are brought into contact by rotation of spinning collar 22 relative to container neck 20 in the twist-off direction, collar 22 and/or neck 20 deflect to allow ratchet lug 42 to slide over and past ratchet lug 44. This, in turn, permits full, 360° rotation of spinning collar 22 relative to container neck 20 in the twist-off direction; that is, rotation of collar 22 relative to neck 20 over and through a 360° ROM. Conversely, ratchet lugs 42, 44 are shaped and dimensioned such that, when brought into contact by rotation of spinning collar 22 relative to container neck 20 in the twist-on direction, the relatively flat or non-ramped ends of ratchet lugs 42, 44 abut to prevent further relative rotation of collar 22 and neck 20. Stated differently, ratchet lug 42 abuts ratchet lug 44 to create a physical impasse when spinning collar 22 is rotated relative to container neck 20 in the twist-off direction.

Ratchet lugs 42, 44 thus cooperate or combine to obstruct complete, 360° rotation of spinning collar 22 relative to container neck 20 in the twist-on direction. This enhances the ease with which overcap 24 can be reattached to spinning collar 22 and, therefore, to container neck 20 by an end user. The number and positioning of ratchet lugs 42, 44 can be tailored to prevent rotation of spinning collar 22 relative to container neck 20 over any angular ROM less than 360° in the twist-on direction. Stated generally, ratchet lugs 42, 44 may cooperate to prevent rotation of spinning collar 22 relative to container neck 20 in the twist-on direction over, but not beyond an angular ROM of x°, wherein x is less than 360°. As a specific, albeit arbitrary example, spinning collar cap assembly 12 can contain four ratchet lugs 44, which are angularly spaced about container neck 20 at regular intervals such that spinning collar 22 can be rotated relative to neck 20 over, but not beyond a 90° ROM in the twist-on direction. Similarly, in another implementation, three ratchet lugs 44 may be angularly spaced about container neck 20 at regular intervals such that collar 22 can be rotated relative to neck 20 over, but not beyond a 120° ROM in the twist-on direction. Various other embodiments are also possible.

In the above-described manner, ratchet lugs 42, 44 cooperate to provide a unidirectional rotational interface, which permits rotation of spinning collar 22 relative to container neck 20 through a 360° ROM in the twist-off direction, while preventing rotation of collar 22 relative to neck 20 through an angular ROM less than 360° in the twist-on direction. This allows a user to reattach overcap 24 to spinning collar 22 by rotating overcap 24 in the twist-on direction, while simply grasping container body 14, rather than requiring the user to grip or hold spinning collar 22 during overcap reattachment. Other types of unidirectional rotational interfaces are also possible in further embodiments. Further, spinning collar cap assembly 12 may lack such a unidirectional rotational interface in alternative implementations, in which case a user hold spinning collar 22 when reattaching overcap 24 by rotation in the twist-on direction.

With continued reference to FIGS. 1-2, ratchet lug 44 is a unique feature, which is not typically present in conventional snap lid neck finishes. Ratchet lug 44 can therefore be added by fabrication as a discrete piece, which is adhesively attached, heat staked, or otherwise affixed to neck 20 in implementations. Manufacturing efficiency and cost will typically be enhanced, however, by forming ratchet lug 44 as a native molded feature in embodiments in which container neck 20 (and, more broadly, container body 14) are formed by injection molding. In such embodiments, the tool or mold utilized to produce container neck 20 and, perhaps, container body 14 can be modified through controlled material removal (e.g., by computer numerical control (CNC) milling) to create a negative feature or void, which then defines ratchet lug 44 when filled with mold material. In industry terms, this is often referred to as "metal safe" and enables existing tooling to be modified to include features, such as ratchet lug 44, in a cost efficient and timely manner.

Spinning collar cap assembly 12 has been principally described herein as adapted to include or to function with a container neck having a pre-existing snap neck finish. Advantageously, this allows incorporation of spinning collar cap assembly 12 into existing product lines or part numbers with minimal modifications and costs. This notwithstanding, embodiments of spinning collar cap assembly 12 are not limited to usage with container necks having a snap lid neck finish or with any other type of conventional neck finish. Instead, spinning collar cap assembly 12 can readily be fabricated to include or to cooperate with a container neck having any shape, dimensions, and structural features allowing spinning collar 22 to be retained therearound in a manner permitting collar rotation relative to neck 20 in at least the twist-off direction, as discussed throughout this document. Various inverted relationships of the structural interfaces presented herein are also contemplated in alternative embodiments; e.g., an annular groove or inner circumferential channel may be provided around an inner periphery of collar 22, while snap lug 34 is formed to project outwardly from the outer peripheral surface of container neck 20 and engage into the inner circumferential channel when cap assembly 12 is assembled. As a still further possibility, spinning collar cap assembly 12 may be fabricated as a plug-type closure. In this latter instance, at least a portion of spinning collar 22 may extend around an inner periphery of container neck 20, while the below-described collar-overcap interface is formed along an inner periphery of collar 22 and an outer periphery of overcap 24.

In the illustrated embodiment of FIGS. 1-2, overcap 24 engages spinning collar 22 via a threaded interface 46, 48. Threaded interface 46, 48 is defined by a helical thread feature 46 provided around an outer periphery of collar 22 and a corresponding or mating helical thread feature 48 provided around an inner periphery of annular sidewall 50 of overcap 24. Threaded interfaces 46, 48 are imparted with the appropriate physical characteristics (e.g., handedness and pitch) such that overcap 24 can be securely twisted or tightened onto spinning collar 22 to enclose opening 18 and, more generally, the interior of container body 14 by rotation of overcap 24 relative to collar 22 in the twist-on direction. Conversely, threaded interface 46, 48 also allows overcap 24 to be removed or detached from spinning collar 22 by relative rotation between these components in the twist-off direction. A thread stop feature 52 may be formed on spinning collar 22 to halt further rotation of overcap 24 relative to collar 22 in the twist-on direction after overcap 24 has been rotated into its fully closed position.

Spinning collar cap assembly 12 further includes a number of detent features 54, 56, which are formed on spinning collar 22 and overcap 24. As indicated in FIG. 1, at least a first detent feature 54 may be formed on an outer peripheral portion of spinning collar 22, while at least a second detent feature 56 may be formed on an inner peripheral portion of overcap 24. Detent features 54, 56 cooperate or combine to provide a predictable, controlled resistance encountered by a user when rotating overcap 24 into and out of its fully closed position. The resistance provided by detent features 54, 56 is also ideally selected, by design, to be sufficient to overcome any frictional forces that would otherwise prevent relative rotation of spinning collar 22 and container neck 24 in the twist-off direction. In this manner, when overcap 24 is tightened onto spinning collar 22, detent features 54, 56 provide a modest latching force, which rotationally locks overcap 24 to spinning collar 22. This latching force ensures co-rotation of spinning collar 22 and overcap 24 when overcap 24 is turned in the twist-off direction and rotation of spinning collar 22 remains manually undeterred.

Spinning collar 22 is further imparted with a manual grip portion 58. Manual grip portion 58 can assume any form enabling spinning collar 22 to be manually gripped or grasped from the exterior of child-resistant container 10 when spinning collar cap assembly 12 is closed, as shown in FIG. 2. In the illustrated example, specifically, manual grip portion 58 assumes the form of a lower peripheral flange or annular rim, which extends from a lower peripheral edge of the annular body of spinning collar 22. Manual grip portion 58 is thus referred to hereafter as "lower collar rim 58." In other implementations, spinning collar 22 may include a grip portion or multiple grip portions assuming various other forms, providing that such grip portion(s) can be manually contacted when spinning collar cap assembly 12 is closed to prevent or at least deter co-rotation of spinning collar 22 with overcap 24 when turned in the twist-off direction. If desired, the outer surface of lower collar rim 58 may be knurled or otherwise texturized to enhance user grip. As shown most clearly in FIG. 2, lower collar rim 58 may be located adjacent and between lower annular shelf or ridge 38 of container body 14 and the lower peripheral edge of overcap 24, as taken along axis 28 when cap assembly 12 is assembled and resides in a closed state.

Spinning collar cap assembly 12 can be tailored, by design, to vary the contour, dimensions, manual accessibility, and visibility of the grip portion of spinning collar 22 (lower collar rim 58 in the illustrated embodiment). For example, lower collar rim 58 may be dimensioned to extend radially beyond the lower peripheral edge of overcap 24 in certain embodiments. In other embodiments, lower collar rim 58 may be dimensioned to be radially recessed relative to the lower peripheral edge of overcap 24. As a still further possibility, lower collar rim 58 may be imparted with an OD that is substantially equivalent to that of the lower peripheral edge of overcap 24. The term "substantially equivalent," as appearing herein, is defined as differing by less than 10%. Finally, lower collar rim 58 may be visibly exposed from the exterior of child-resistant container 10 when in an upright position. In other implementations, overcap 24 may be able to slide along axis/centerline 28, within limits, when attached to spinning collar 22. Additionally, overcap 24 may be molded or otherwise fabricated to include a lower peripheral skirt or cuff, which extends radially beyond and overhangs collar rim 58 when cap assembly 12 is closed. The lower peripheral skirt of overcap 24 may cover and, thus, visually obscure or hide lower collar rim 58 when child-resistant container 10 is an upright position. In such embodiments, a user may first slide overcap 24 upward (away from container body 14) to expose lower collar rim 58 before performing the remaining cap detachment steps outlined below. An additional level of child deterrence is provided as a result.

Detachment of overcap 24 may be performed as follows. First, as indicated in FIG. 2, an adult user grasps or otherwise physically contacts the manual grip portion (lower collar rim 58) of spinning collar 22. The adult user does this in a manner preventing spinning collar 22 from co-rotating with overcap 24 when turned in the twist-off direction. Depending upon the size and shape of container body 14, an adult user may prevent rotation of spinning collar 22 utilizing his or her thumb, while holding container body 14 or by simply grasping collar 22 in a pinching motion. Utilizing the same hand or the other hand, the user turns overcap 24 in the twist-off direction to detach overcap 24 from collar 22 and gain access to inner cavity 16. For completeness, it is noted that overcap removal can also be achieved by holding overcap 24 stationary in three-dimensional space, while rotating spinning collar 22 in the twist-on direction (resulting in overcap rotation relative to collar 22 in the twist-off direction). However, in actual practice, relatively few adult users will likely attempt to open cap assembly 12 in this manner.

As noted above, thread stop feature 52 and detent features 54, 56 provide a controlled latching force, which rotationally locks overcap 24 to spinning collar 22 when tightened together. Ideally, this latching force is selected to exceed frictional forces between spinning collar 22 and container neck 20, which could otherwise deter rotation of collar 22 relative to neck 20 in the twist-off direction. Such a latching force, taken in conjunction with the ability of spinning collar 22 to freely rotate relative to container neck 20 in the twist-off direction, ensure that a child (or other user) attempting to open spinning collar cap assembly 12 by grasping container body 14 without concurrently taking steps to manually prevent rotation of spinning collar 22 will be unable to remove overcap 24. Instead, in this case, overcap 24 and spinning collar 22 will co-rotate relative to container neck 20, while overcap 24 and collar 22 remain joined. Co-rotation of overcap 24 and spinning collar 22 may also create a diversion or decoy, which may delay further efforts by a child to gain access to child-resistant container 10.

After removal, overcap 24 may be reattached to container neck 20 in the following manner. First, an adult user properly positions overcap 24 over container neck 20; that is, such that threaded inner periphery 48 of overcap 24 engages threaded outer periphery 46 of spinning collar 22. The adult user then turns overcap 24 relative to spinning collar 22 in the twist-on direction. The user may grip lower collar rim 58 to prevent rotation of spinning collar 22 when turning overcap 24 in this manner; however, this is unnecessary in the illustrated example due to the provision of the above-described unidirectional rotational interface and, specifically, ratchet lugs 42, 44. When overcap 24 is fully tightened onto spinning collar 22, further rotation of overcap 24 in the twist-on direction is prevented by thread stop 52. Detent features 54, 56 may be designed to produce an audible sound or vibrational, haptic response (generally perceived as a "click") signaling the user when overcap 24 has been fully and properly tightened onto spinning collar 24. This returns spinning collar cap assembly 12 to its fully closed position and resets the child deterrent functionality of cap assembly 12.

Still further levels of child deterrence may be realized by sizing and/or contouring spinning collar 22 such that collar 22 cannot be readily gripped by relatively young children. For example, spinning collar 22 may be imparted with an outer diameter that can be readily gripped by most adults, but which young children with smaller hands find difficult to grasp. It has been determined that imparting spinning collar 22 and, specifically, collar rim 58 with an outer diameter equal to or greater than about 100 millimeters is sufficient for this purpose; although the outer diameter of spinning collar 22 need not exceed this threshold in all embodiments. Additionally or alternatively, child deterrence may be improved by tailoring detent features 54, 56 to provide a predetermined resistance to turning of overcap 24 relative to spinning collar 22 in the twist-off direction, with the predetermined resistance easily overcome by adults, but prohibitively difficult for young children to overcome. In yet further embodiments, child deterrence may be enhanced through the provision of tamper evident features. To further emphasize this latter point, an example of such tamper evident features will now be in conjunction with FIG. 3.

Figure 3:
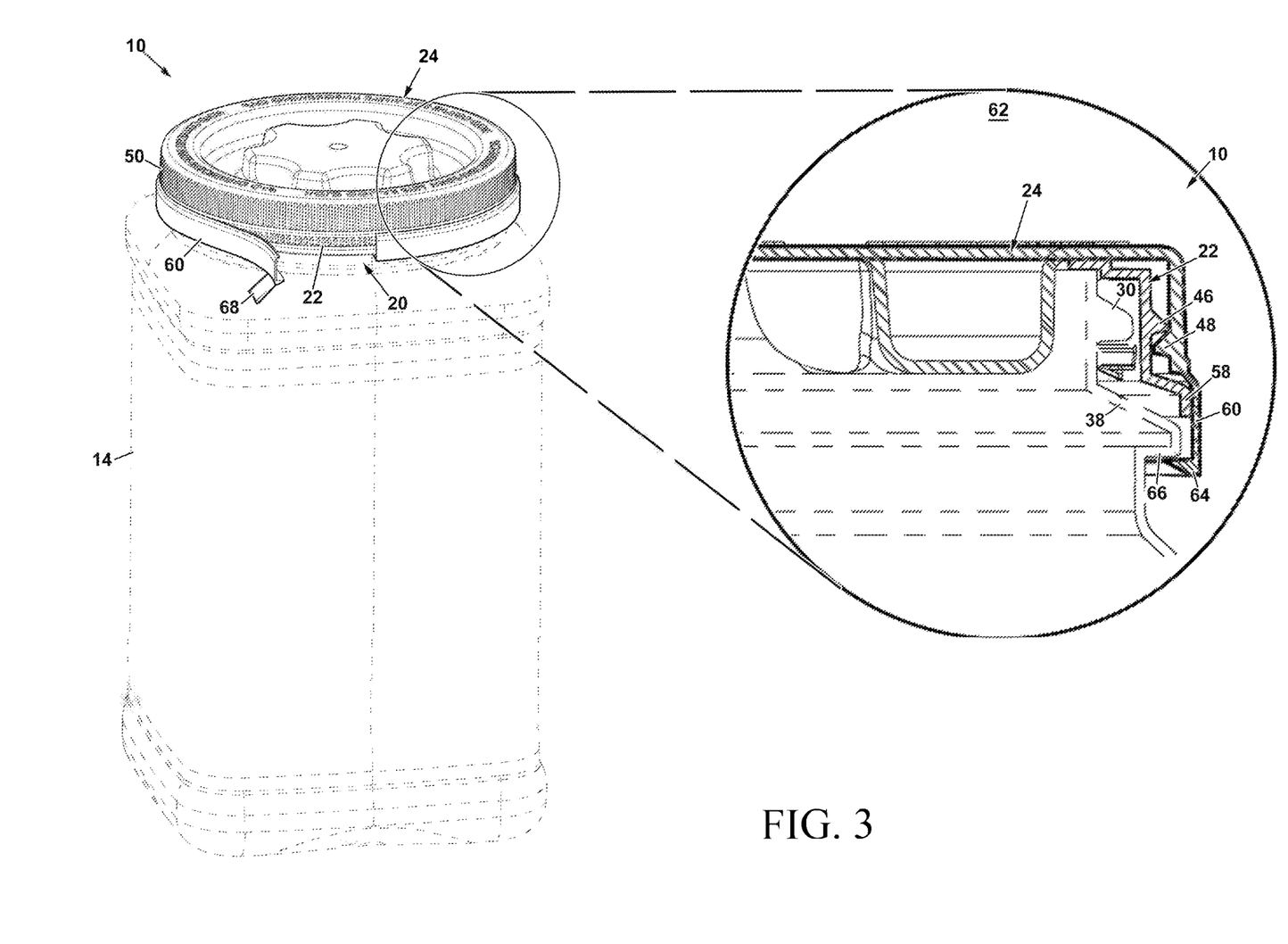
FIG. 3 illustrates the child-resistant container shown in FIGS. 1-2 with the addition of a tamper evident tear strip, as further depicted with an exemplary embodiment of the present disclosure.

FIG. 3 illustrates an embodiment of child-resistant container 10 in which spinning collar cap assembly 12 is produced to include a tamper evident feature in the form of an exemplary tamper evident tear strip 60. Child-resistant container 10 is illustrated isometrically on the left side of FIG. 3, with tamper evident tear strip 60 shown in a partially removed state. Here, container body 14 and container neck 20 are shown in phantom to more clearly depict spinning collar cap assembly 12 and tamper evident tear strip 60. Comparatively, on the right side of FIG. 3 in detail bubble 62, a limited portion of spinning collar cap assembly 12 is shown in cross-section. As best shown in detail bubble 62, tamper evident tear strip 60 may extend downwardly (toward container body 14) from a lower peripheral edge of overcap 24. Tamper evident tear strip 60 is sized and positioned to physically cover or circumferentially shroud spinning collar 22, particularly lower collar rim 58, until such time as tear strip 60 is removed by an end user; e.g., as accomplished by gripping and pulling tab 68 to reveal collar 22, as indicated on the left side of FIG. 3. An end user is thus prevented from accessing spinning collar 22 and detaching overcap 24 without initial removal of tamper evident tear strip 60.

In certain embodiments, tamper evident tear strip 60 may physically engage container neck 20 and/or container body 14. For example, as further shown in FIG. 3, tamper evident tear strip 60 may further include an inner peripheral lip 64, which extends inwardly from the main body of tamper evident tear strip 60 to engage container neck 20. Specifically, inner peripheral lip 64 of tamper evident tear strip 60 engages the underside of a lower ledge portion or overhang 66, as located beneath annular ridge 38 of container neck 20. This provides an additional or redundant measure preventing overcap detachment prior to tear strip removal. This example notwithstanding, tamper evident tear strip 60 may not engage container neck 20 in other embodiments and, instead, partially or wholly cover spinning collar 22 to provide the desired tamper evident functionality. Tamper evident tear strip 60 can be integrally formed with overcap 24 as single molded piece, with appropriate thinning or perforations to facilitate user removal of tear strip 60. Alternatively, tear strip 60 can be produced as a discrete piece or package component, such as a shrink band seal. In further embodiments, spinning collar cap assembly 12 may include other types of (e.g., frangible) tamper evident features in addition to or in lieu of tamper evident tear strip 60; or cap assembly 12 may lack tamper evident features.

Accordingly, the present application provides child-resistant containers or packages having unique spinning collar cap assemblies. The above-described spinning collar cap assemblies can be designed to provide relatively high levels of child deterrence, while remaining relatively intuitive and easy-to-use for the majority of adults. Additionally, in some implementations, the spinning collar cap assembly may be readily adaptable to snap lid neck finishes of the type utilized in existing product lines. Embodiments of the spinning collar cap assembly generally include spinning collar, which is adapted for engagement onto container neck by, for example, snap fit or interference fit retention. An outer overcap or lid piece may thread to or otherwise attach to the spinning collar to close the spinning collar cap assembly. When the spinning collar cap assembly is fully assembled and the overcap is closed (that is, attached to the collar), the bulk of the spinning collar may be visibly hidden or obscured and not immediately apparent to a young child, such as a toddler. Additionally, the combination of the overcap and spinning collar may be able to co-rotate or spin freely about container neck in the above-described twist-off direction, which may create an interactive diversion deterring further attempts by a child to open the container. Through such attributes, and for the other reasons discussed above, the disclosed spinning collar cap assemblies and, more broadly, child-resistant containers may provide effective child deterrent measures in regulating access to the container interior and the contents stored therein.

While the foregoing description focuses primarily on articles of manufacture, namely, child-resistant containers having spinning collar cap assemblies, there has also been disclosed methods for manufacturing child-resistant containers. Such methods for manufacturing child-resistant containers having spinning collar cap assemblies may entail direct fabrication of any component or components included within the spinning collar cap assembly, partial or complete assembly of the spinning collar cap assembly, or any combination thereof. Further, any number of entities can fabricate the components within the spinning collar cap assembly, which can be produced utilizing various manufacturing techniques including, but not limited to, blow molding, injection molding, and additive manufacturing processes. Further, while one of the entities responsible for fabricating components included the cap assembly will often perform the assembly process, this need not always be the case. For example, it is possible for a first manufacture or group of manufacturers to fabricate the components included in the spinning collar cap assembly or the child-resistant container and subsequently ship the components to a second entity for assembly purposes. The second entity may also fill the container with its desired contents.

In keeping with the foregoing paragraph, a method for manufacturing a child-resistant package includes the step or process installing a spinning collar around a container neck such that the spinning collar is retained around the container neck, while remaining rotatable thereto through a 360° ROM in a first rotational direction; e.g., the above-described "twist-off" direction, which may be either a clockwise or a counter-clockwise direction. An overcap or lid piece is then attached to the spinning collar by, for example, placing a threaded inner peripheral surface of the overcap in contact with a threaded outer peripheral surface of the spinning collar and rotating the overcap relative to the spinning collar in a second rotational direction opposite the first rotational direction. In certain embodiments, the installation process may entail engaging a snap lug or other projection, which extends from an inner periphery of the spinning collar, into an outer circumferential channel provided around the container neck. Additionally, installation may further entail press-fitting the spinning collar onto the container neck such that the projection slides over a neck bead, which extends partially around an outer periphery of the container neck, to engage into the outer circumferential channel.

In further instances, the above-described method for manufacturing a child-resistant package may include the step or process of selecting the container neck (whether by purchase from a supplier, by independent fabrication, or by otherwise obtaining the container neck) to include a neck finish having: (i) an outer circumferential channel, (ii) a neck bead bounding an upper portion of the outer circumferential channel, and (iii) a gap in the neck bead having a first length as taken about a centerline of the container neck. Additionally, in at least some implementations, the method may also include selecting the spinning collar (whether by purchase, by independently fabricating, or by otherwise obtaining the container neck) to comprise a snap lug, which is received into the outer circumferential channel when the spinning collar is installed around a container neck and which has a second length greater than the first length, as taken about a centerline of the spinning collar.

Terms such as "first" and "second" have been utilized above to describe similar features or characteristics (e.g., rotational directions) in view of the order of introduction during the course of description. In other sections of this application, such terms can be varied, as appropriate, to reflect a different order of introduction. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A child-resistant container, comprising:
 a container body having an inner cavity, an opening to the inner cavity, and a container neck circumscribing the opening, the container neck comprising an outer circumferential channel, an outer periphery, and an annular shelf extending around the outer periphery;
 a spinning collar comprising an inner peripheral surface and a projection extending inwardly from the inner peripheral surface and received within the outer circumferential channel to thereby be retained around the container neck and simultaneously rotatable, relative to the container neck, through any number of complete revolutions in at least a first rotational direction;
 an overcap sized and shaped to enclose the opening and block access to the inner cavity when the overcap is attached to the spinning collar; and
 a threaded interface provided between the spinning collar and the overcap, the threaded interface enabling the overcap to be (i) detached from the spinning collar by rotation of the overcap relative to the spinning collar in the first rotational direction and (ii) removably attached to the spinning collar by rotation of the overcap relative to the spinning collar in a second rotational direction opposite the first rotational direction,
 wherein the spinning collar comprises:
  a manual grip portion having an annular rim, the annular rim disposed between the annular shelf and a lower peripheral edge of the overcap when the overcap is tightened onto the spinning collar, the manual grip physically accessible from an exterior of the child-resistant container when the overcap is attached to the spinning collar, and a lower peripheral edge from which the annular rim projects in a radially outward direction.

2. The child-resistant container of claim 1, wherein the spinning collar is rotatable with respect to the container neck in the first rotational direction through a 360 degree range of motion;

wherein the child-resistant container further comprises detents formed on the spinning collar and the overcap; and wherein the detents engage when the overcap is tightened onto the spinning collar such that the spinning collar co-rotates with the overcap when turned in the first rotational direction, while rotation of the spinning collar is manually undeterred.

3. The child-resistant container of claim 1, further comprising a tamper evident feature extending from the overcap toward the container body to at least partially cover the spinning collar collar.

4. The child-resistant container of claim 3, wherein the tamper evident feature comprises a tamper evident tear seal integrally formed with the overcap as a single molded piece.

5. The child-resistant container of claim 1, wherein the container neck further comprises:

an outer peripheral surface; and a neck bead bounding an upper portion of the outer circumferential channel and extending at least partially around the outer peripheral surface, as taken about a centerline of the container neck.

6. The child-resistant container of claim 1, further comprising a unidirectional rotational interface formed between spinning collar and the container neck;

wherein the unidirectional rotational interface is configured to permit rotation of the spinning collar relative to the container neck in the first rotational direction through a 360 degree range of motion, while restricting rotation of the spinning collar relative to the container neck in the second rotational direction to an angular range of motion less than 360 degrees.

7. The child-resistant container of claim 1, wherein the spinning collar and the container neck comprise first and second ratchet lugs, respectively;

wherein the first ratchet lug slidably passes over the second ratchet lug when the spinning collar is rotated relative to the container neck in the first rotational direction through a 360 degree range of motion; and wherein the first ratchet lug abuts the second ratchet lug to create a physical impasse when the spinning collar is rotated relative to the container neck in the second rotational direction.

8. The child-resistant container of claim 7, wherein the container neck comprises an outer circumferential channel in which the second ratchet lug is located.

9. A child-resistant cap assembly, comprising:

an overcap having a threaded inner surface and a lower peripheral edge; and a spinning collar, comprising:

an annular collar body sized and shaped for installation around a container neck having an outer circumferential channel;

a retention feature projecting from the annular collar body in a radially inward direction, the retention feature configured to engage into the outer circumferential channel to retain the spinning collar around the container neck, while simultaneously permitting rotation of the spinning collar relative to the container neck through any number of complete revolutions in a first rotational direction;

a lower collar rim extending radially outward from the annular collar body, the lower collar rim (i) located adjacent the lower peripheral edge of the overcap when the overcap is attached to the spinning collar and (ii) physically accessible from an exterior of the child-resistant cap assembly when the overcap is attached to the spinning collar; and a threaded outer surface around the annular collar body, the threaded outer surface and the threaded inner surface cooperating to permit attachment of the overcap to the spinning collar by rotation of the overcap relative to the spinning collar in a second rotational direction opposite the first rotational direction.

10. The child-resistant cap assembly of claim 9, wherein the child-resistant container further comprises detents formed on the spinning collar and the overcap; and wherein the detents engage when the overcap is tightened onto the spinning collar such that the spinning collar co-rotates with the overcap when turned in the first rotational direction and rotation of the spinning collar is manually undeterred.

11. The child-resistant cap assembly of claim 9, further comprising a tamper evident tear seal, which is integrally formed with the overcap and which covers at least a portion of the spinning collar.

12. The child-resistant cap assembly of claim 9, wherein the container neck further comprises a neck bead bounding an upper portion of the outer circumferential channel; and wherein the child-resistant cap assembly further comprises a snap lug sized and shaped to slide over the neck bead and engage into the outer circumferential channel when the spinning collar is pressed onto the container neck.

13. The child-resistant cap assembly of claim 9, further comprising a unidirectional rotational interface formed between spinning collar and the container neck when the spinning collar is installed there around; and wherein the unidirectional rotational interface permits rotation of the spinning collar relative to the container neck in the first rotational direction through a 360 degree range of motion, while preventing rotation of the spinning collar relative to the container neck through a range of motion less than 360 degrees in the second rotational direction.

14. The child-resistant cap assembly of claim 9, wherein the spinning collar and the container neck comprise first and second ratchet lugs, respectively; and wherein the first ratchet lug slidably passes over the second ratchet lug when the spinning collar is rotated relative to the container neck in the first rotational direction through a 360 degree range of motion.

* * * * *